June 3, 1930. J. W. MARTIN, JR 1,760,953
METHOD OF MAKING AND DISPENSING LIQUID CARBON DIOXIDE
Original Filed April 12, 1926
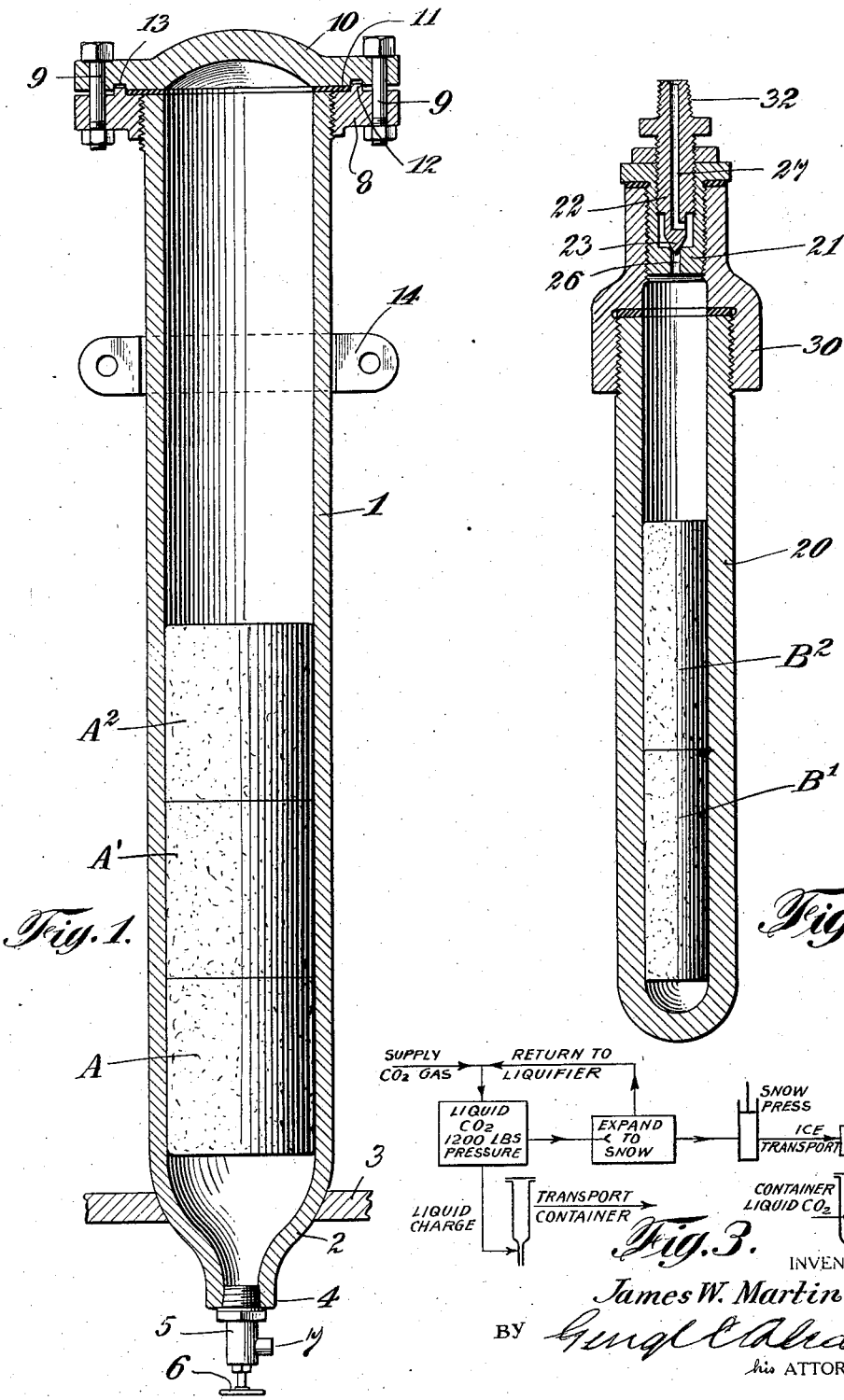
INVENTOR
James W. Martin, Jr
BY
his ATTORNEY Patented June 3, 1930

1,760,953

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

METHOD OF MAKING AND DISPENSING LIQUID CARBON DIOXIDE

Application filed April 12, 1926, Serial No. 101,606. Renewed October 2, 1929.

My present method relates more particularly to liquid carbon dioxide as a commodity, regardless of the particular use to which it is to be applied. The object of the method is to facilitate, simplify and standardize the charging of containers in which the liquid is sold or from which it is dispensed, and particularly to accurately predetermine the precise amount of carbon dioxide in the containers so that all containers of the same size and model can be reliably represented as containing the same amount of carbon dioxide.

Similar methods may be conveniently employed for accurately charging any container for any purpose, either with the maximum safe amount or any desired less amount of the carbon dioxide.

At present, it is the custom to produce carbon dioxide gas and render the same liquid at ordinary temperatures by compressing it to 1,000 pounds to 1200 pounds per square inch. With such pressures it will remain liquid at all temperatures up to the critical temperature of 88° F., where it will lose its liquid quality and become a gas, regardless of what the pressure may be. The present practice is to force this liquid into thick wall steel containers, charging the same to the above described high pressures. But in practice, there is no direct way of measuring the amount of carbon dioxide within the container, the present practice being to determine this by weighing the bottle and noting the amount of increase in its weight due to the charging with the liquid carbon dioxide. Internal conditions, particularly as to how much of the container has been filled with the liquid and how much has been left empty, are determined by further deduction from the known cubical contents of the container and the ascertained weight of the carbon dioxide therein. Where the purpose is to get a precisely predetermined amount of the liquid in the container, say enough to fill the same two-thirds full, there are obvious difficulties due to undercharging and overcharging, and finally the adjustment by careful venting down to the desired weight. In practice, it often occurs that the latter adjustment is either neglected, or is wasteful, by reason of the excess carbon dioxide being allowed to escape into the atmosphere.

Attempts to gauge the amount of the carbon dioxide by measuring the volume of the liquid are impractical because, as has recently been discovered, carbon dioxide liquid is unlike any other liquid in that it is highly compressible.

Under such conditions and with such a commodity, I have devised my present method, which includes freezing the liquid carbon dioxide to form carbon dioxide snow or "ice", preferably molded in forms adapted to fit the container and preferably also making the containers with removable closures adapted to open up the full maximum cross-section of the container for insertion of the ice. Another recent discovery is that the volume of the ice does not measure its carbon dioxide content, the clearest kind of ice being found to vary as much as 25%, say from below 80 pounds up to say 105 pounds per cubic foot, dependent on the pressure exerted on the same at the time of consolidation. Ice blocks prepared by compressing carbon dioxide snow show similar variation, the weights of well solidified blocks running as low as 70 pounds, 65 pounds and 60 pounds, or even lower, per cubic foot.

Consequently, the blocks must be standardized as to density if the charge in the container is to be engaged solely by the number of blocks and while this is entirely practical, in certain cases a simpler and more general way is to weigh the ice charged just before putting it into the container.

The heat of the container will almost immediately melt enough ice and evolve enough carbon dioxide gas to expel the air, whereupon the closure may be clamped on at substantially atmospheric pressure. In due time, the ice will all melt by heat absorbed through the walls of the container, the melting being at first sublimation to gas form, after the well known manner of carbon dioxide ice, and then as the pressure increases in the confined space, the final melting will be directly to liquid. Where the weight of carbon dioxide in the blocks is designed for setting up the above described internal pressures of 1000 pounds to 1200 pounds per square inch, the volume of the liquid will naturally be much greater than the volume of the blocks, because liquid carbon dioxide at such pressures and at normal atmospheric temperatures is about 47 pounds per cubic foot as against the above described 65 to 105 pounds per cubic foot of the ice.

Practical illustrations of how my method may be applied will now be described in connection with the accompanying drawings, in which Fig. 1 is a vertical longitudinal section on a much reduced scale, showing one of the large liquid dispensing containers such as commonly employed at the works for various dispensing purposes, while Fig. 2 is a similar section of one of the smaller containers, or so-called "power bottles" in which the liquid carbon dioxide is retailed for various purposes; and Fig. 3 is a flow-sheet diagram.

The container shown in Fig. 1 may be of any desired size, but is typical of larger containers which may be say 8 or 10 inches in diameter by 4 feet or more in height. It comprises a drawn steel tube 1, with very heavy walls contracted at the lower end 2 to form shoulders adapted to rest upon a suitable stationary support as 3 and to provide a reduced outlet portion 4, having a valve fitting 5, controlled by hand wheel 6, to discharge the carbon dioxide through the outlet 7. The open upper end is provided with a massive flange collar 8, to which is secured by heavy bolts 9, the cover plate 10. As shown, there is an intermediate lead gasket 11, surrounded by an annular upstanding flange 12 on the collar 8, which fits a corresponding groove 13 in the cover plate 10. The upper end of the container is shown as stayed by a fitting 14, which may be attached to the wall.

When it is desired to charge the container, the bolts 9 are unfastened, the cover 10 removed and one or more blocks, as A, A', A², etc., are slipped into the container. As the ice melts at approximately 114° below zero, the container will be relatively hot even at low atmospheric temperatures, so that the ice will gasify enough to displace the air from the container, while the cover plate is being replaced and bolted. Thereupon, the blocks will melt as above described. If the blocks of ice have a density of say 95 pounds per cubic foot, they will yield almost exactly twice their volume of liquid at 1000 to 1200 pounds pressure; while ice having a density of 70 pounds per cubic foot, will yield 1½ times its volume of liquid. As it is practically unsafe to have these containers more than two-thirds full of liquid at the pressures specified, two or at least 3 blocks, such as A, A', A², at say the 70 pounds density will be as much as should be used except for special purposes, where such a great safety factor may be undesirable or unnecessary.

Such a container is commonly used for charging a small dispensing container, or "power bottle", which may be of the type illustrated in Fig. 2. In such containers the seamless drawn tube 20 is commonly about 1½ inches in external diameter and the total length of the tube is say 15 inches. Hence a dispensing container such as shown in Fig. 1, will be of capacity sufficient to charge a very large number of the smaller containers such as shown in Fig. 2. According to present practice, the container 20 is made integral with a contracted neck portion, which is closed by a suitable valve which is conventionally shown as comprising a valve casing member 21 having screw-threaded therein a valve stem 22 carrying a valve 23, which may be screwed up or down to open or close the passage 26 which communicates with the interior of the container. When the valve is unscrewed from its seat, the gas or liquid can escape through the passage 27. In the form shown in the drawings, the body portion 20 is not integral with the valve outlet, the latter comprising a cylindrical portion 30, screw-threaded over the body portion 20 and having a reduced neck 31, in which the valve fitting is located. These parts form a removable closure for the upper end of the body 20. Consequently, this container can be charged either in the old fashioned way, by screwing the upper end 32 into the outlet 7 of the large container of Fig. 1, or it also can be charged in accordance with my present method, by unscrewing the top and inserting the solid carbon dioxide blocks, B', B².

The details of my method as applied to the above and other liquid carbon dioxide containers, as well as the advantages of the method, will be readily understood by reference to Fig. 3, which is a flow-sheet diagram, fully explained by the legends thereon. As indicated at the left of the figure, the old method involved a supply of carbon dioxide gas, liquefied and delivered at atmospheric temperature and about 1200 pounds pressure, the liquid supply pipe being merely put in communication with the inside of the container until the internal pressure approximately equalled the external pressure. The thus charged container, which is necessarily of great size and weight, must then be transported to the point where the liquid carbon dioxide is to be utilized.

The diagram also shows, at the right, how the liquid may be expanded to produce snow and cold gas, the gas being returned to the liquefier and the snow being compressed to ice in the snow press. Then the ice is transported or shipped whatever distance may be necessary to reach the container to be charged.

As advantages in shipping, it is to be noted that by my method the carbon dioxide, in ice form, may be reduced to two-thirds or one-half the volume of the liquid carbon dioxide; the 50% extra space required for safety in the case of the liquid is rendered unnecessary; and the weight and expense of the oversize container are eliminated. In commercial practice, I pack the ice cakes in thick balsa wood boxes, which are not very expensive and which are phenomenally light. Consequently, in quantity shipment the freight or express rate, which is determined by volume and weight, may be less than the cost for shipping ordinary water ice in ordinary boxes. The transportation of the carbon dioxide as ice entirely eliminates the explosion hazard, which is unavoidable for shipments in liquid form.

As before explained, the precise weight of liquid $CO_2$ to be charged into the containers can always be accurately predetermined in accordance with my method, by weighing the blocks of ice just before charging them into the container; but under commercial conditions, where the densities and weights have been standardized, very accurate results may be obtained simply by using the required number of standard blocks. In Fig. 1, for instance, if the blocks A, A', A², are standardized to 70 pound blocks of one cubic foot each and if they half fill the container, it is certain that when the container and its contents have had opportunity to attain ordinary atmospheric temperature, the container will be substantially two-thirds full of liquid, weighing, say, 46 to 48 pounds per cubic foot, the corresponding internal pressure being 1000 to 1200 pounds, according to what the atmospheric temperature happens to be.

I claim:

1. The method of charging high pressure containers with predetermined amounts of liquid carbon dioxide, which method includes charging a desired weight of such ice in the container, hermetically sealing the latter and permitting the enclosed ice to liquefy by exposure of the container to normal atmospheric temperatures.

2. The method of charging high pressure containers with predetermined amounts of liquid carbon dioxide, which method includes separating a desired amount of frozen carbon dioxide by weighing it, placing the thus predetermined weight of the solid carbon dioxide within the container, hermetically sealing the latter and permitting said solid to liquefy by absorption of heat through the walls of the container.

3. The method of charging high pressure containers with predetermined amounts of liquid carbon dioxide, which method includes forming frozen carbon dioxide in blocks of size adapted to approximately fit the cross-section of the container, placing the thus predetermined weight of the solid carbon dioxide within the container, hermetically sealing the latter and permitting said solid to liquefy by absorption of heat through the walls of the container.

4. The method of charging high pressure containers with predetermined amounts of liquid carbon dioxide, which method includes forming frozen carbon dioxide in blocks of standardized density and of size adapted to approximately fit the cross-section of the container, placing the thus predetermined weight of the solid carbon dioxide within the container, hermetically sealing the latter and permitting said solid to liquefy by absorption of heat through the walls of the container.

5. The method of charging high pressure containers with carbon dioxide, which includes placing carbon dioxide in solid form within the container, sealing the container while the substance is still in solid state, the amount of such solid being predetermined with reference to the cubic contents of the container so that upon rise of temperature of the container to atmospheric temperatures, the internal pressure of the sublimated gas will be sufficient to maintain most of the carbon dioxide in liquid state.

6. The method of charging high pressure containers with carbon dioxide, which includes placing carbon dioxide in solid form within the container, and then sealing the container while the substance is still in solid state whereby upon rise of temperature of the container the solid will be converted into liquid carbon dioxide.

7. The method of charging high pressure containers with substantially pure carbon dioxide, which method includes making frozen carbon dioxide blocks of desired size, density and weight, placing the desired weight of such blocks in the container, hermetically sealing the container while the substance is still in solid state and permitting sufficient rise of temperature to sublimate or melt said blocks.

8. The method of introducing a charge of compressed carbon dioxide into a container which method includes placing carbon dioxide in solid form, within the container, closing the container while the substance is still in solid form, so as to limit expansion of the gas therefrom, and then raising the temperature sufficiently to evolve gas required to produce the desired pressure.

9. A method for the utilization of carbonic acid forwarded to the place of use in a solid form, comprising the confining of the acid in a solid form in a heat conducting vessel and permitting the heat exchange between the vessel and acid and between the surrounding air and acid through the wall of the vessel to convert said solid acid into a gaseous state.

10. A method for the utilization of carbonic acid forwarded to the place of use in a solid form, comprising the confining of the acid in a solid form in a heat conducting vessel and permitting the heat exchange between the vessel and acid and between the surrounding air and acid through the wall of the vessel to convert said solid acid into a gaseous state, and further assisting the conversion of the solid acid by the pressure generated in the vessel in the initial conversion of the solid acid to the gaseous state.

Signed at New York city in the county of New York, and State of New York, this 10th day of April, A. D. 1926.

JAMES W. MARTIN, Jr.